US012807235B2

(12) United States Patent
Hansson et al.

(10) Patent No.: US 12,807,235 B2
(45) Date of Patent: Nov. 24, 2026

(54) VEHICLE PILLAR

(71) Applicants: Ningbo Geely Automobile Research & Development Co., Ltd., Ningbo (CN); Zhejiang Geely Holding Group Co., Ltd., Zhejiang (CN)

(72) Inventors: Kim Hansson, Gothenburg (SE); Christopher Berghoff, Gothenburg (SE); Mattias Ericsson, Gothenburg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 219 days.

(21) Appl. No.: 18/890,075

(22) Filed: Sep. 19, 2024

(65) Prior Publication Data

US 2025/0010921 A1 Jan. 9, 2025

Related U.S. Application Data

(63) Continuation of application No. PCT/CN2023/084862, filed on Mar. 29, 2023.

(30) Foreign Application Priority Data

Apr. 12, 2022 (EP) .................................... 22167850

(51) Int. Cl.
*B62D 25/04* (2006.01)

(52) U.S. Cl.
CPC .................................. *B62D 25/04* (2013.01)

(58) Field of Classification Search
CPC ...................................................... B62D 25/04
See application file for complete search history.

(56) References Cited

U.S. PATENT DOCUMENTS

| | | | | |
|---|---|---|---|---|
| 5,246,264 A * | 9/1993 | Yoshii | B62D 25/04 296/202 |
| 5,671,968 A | 9/1997 | Masuda et al. | |
| 6,209,950 B1 * | 4/2001 | Hanyu | C09D 11/324 296/203.02 |
| 6,217,109 B1 * | 4/2001 | Okana | B62D 25/025 296/203.03 |
| 6,279,990 B1 * | 8/2001 | Miyasaka | B62D 25/04 296/193.06 |
| 6,322,135 B1 * | 11/2001 | Okana | B62D 25/04 296/203.03 |

(Continued)

FOREIGN PATENT DOCUMENTS

| | | |
|---|---|---|
| DE | 102009043265 A1 | 3/2011 |
| DE | 102004032599 B4 | 6/2020 |

(Continued)

*Primary Examiner* — Aaron L Lembo
(74) *Attorney, Agent, or Firm* — Tucker Ellis LLP

(57) ABSTRACT

A vehicle pillar includes a one-piece pillar component with a lower portion and an upper portion. The one-piece pillar component has a transition zone where the longitudinal extension direction of the one-piece pillar component is changed such that the lower portion and the upper portion are angled relative to each other. The lower portion is connectable to a frame of a vehicle and the upper portion is connectable to a roof of the vehicle.

19 Claims, 7 Drawing Sheets

(56) References Cited

U.S. PATENT DOCUMENTS

| | | | | |
|---|---|---|---|---|
| 6,332,643 | B1 * | 12/2001 | Sukegawa | B62D 25/04 296/193.06 |
| 7,938,480 | B2 | 5/2011 | Orii | |
| 9,676,257 | B2 * | 6/2017 | Jenkins | B60J 5/0461 |
| 10,577,022 | B2 * | 3/2020 | Harrison | B62D 25/04 |
| 10,773,753 | B2 * | 9/2020 | Chiba | B62D 25/02 |
| 10,829,159 | B2 * | 11/2020 | Stibich | B62D 25/06 |
| 11,193,045 | B2 * | 12/2021 | Voigt | C09J 5/00 |
| 11,267,518 | B2 * | 3/2022 | Takayanagi | B62D 21/152 |
| 11,945,508 | B2 * | 4/2024 | Boettcher | B62D 25/02 |
| 12,528,545 | B2 * | 1/2026 | Noguchi | B62D 29/04 |
| 2016/0229457 | A1 | 8/2016 | Boettcher | |
| 2020/0346694 | A1 | 11/2020 | Kim | |

FOREIGN PATENT DOCUMENTS

| | | | |
|---|---|---|---|
| JP | 2021095004 | A | 6/2021 |
| WO | 2003035453 | A1 | 5/2003 |
| WO | 2021046862 | A1 | 3/2021 |

* cited by examiner

VEHICLE PILLAR

RELATED APPLICATION DATA

This application is a continuation of International Patent Application No. PCT/CN2023/084862, filed Mar. 29, 2023, and claims the benefit of European Patent Application No. 22167850.1, filed Apr. 12, 2022, the disclosures of which are incorporated herein by reference in their entireties.

TECHNICAL FIELD

The invention relates to a vehicle pillar, particularly a passenger vehicle pillar.

BACKGROUND

A conventional passenger vehicle has an A-pillar with a tilt angle relative to the vehicle roof where the tilt angle often is in the size of 25-35°. The A-pillar is a front pillar which usually holds the windshield of the vehicle. Further, such an A-pillar is split between an upper portion which is connected to the roof and forms the tilt angle and a lower vertical portion connected to the frame, and the upper portion and the lower portion are joined to each other, for example by welding. This design allows load transfer into the roof of the vehicle in case of a crash.

Such a passenger vehicle does not provide maximal access to the vehicle and comfort for the passenger. In addition to fulfill the demands on crash load cases, improved access and comfort are also desired. The desire to increase accessibility and at the same time achieve sufficient strength may constitute conflicting interests.

SUMMARY

An objective of the invention is to provide a vehicle pillar, particularly a passenger vehicle pillar, which vehicle pillar has an increased strength.

The objective is achieved by a vehicle pillar comprising a one-piece pillar component with a lower portion and an upper portion, wherein the one-piece pillar component has a transition zone where the longitudinal extension direction of the one-piece pillar component is changed such that the lower portion and the upper portion are angled relative to each other, and wherein the lower portion is connectable to a frame of a vehicle and the upper portion is connectable to a roof of the vehicle.

By the term "one-piece pillar component" is meant that the lower portion and the upper portion of the component are made in one piece.

The invention is based on the insight that by using a one-piece pillar component, instead of a conventional lower portion and upper portion which are split and joined by welding, the strength of the vehicle pillar can be increased also in cases where the tilt angle is increased as compared to conventional cars for maximizing the opening for passengers to access the vehicle, even if the increased tilt angle results in a reduced capability of the vehicle pillar to transfer load to the roof of the vehicle.

The lower portion and the upper portion of the one-piece pillar component can be angled relative to each other with an angle in the range 130-175°, preferably 140-170°, and more preferably 150-165°. These intervals correspond to a tilt angle in the ranges 40-85°, 50-80° and 60-75°, respectively, where the upper portion forms the tilt angle relative to a horizontal plane and the lower portion is arranged vertically. Hereby, an opening providing improved access to the vehicle can be achieved.

According to one embodiment, the vehicle pillar comprises a reinforcement component extending along the one-piece pillar component from the lower portion to the upper portion, wherein the reinforcement component is attached to the lower portion and to the upper portion of the one-piece pillar component at connection points, and the vehicle pillar has a continuous area being free of said connection points allowing movement of the one-piece pillar component and the reinforcement component relative to each other in said area, and wherein said area comprises a rear part of the transition zone which transition zone rear part is situated closest to a rear end of the vehicle pillar. Hereby, the reinforcement component will strengthen the whole area around and in the transition zone, thereby avoiding too much local deformation at the same time as some flexibility is provided which reduces the stresses in the rear end of the vehicle pillar preventing cracking in a rear flange of the vehicle pillar.

For example, the reinforcement component can be attached to the lower portion at the connection points by a welding seam, and the reinforcement component can be attached to the upper portion at the connection points by spot welds.

According to a further embodiment, the transition zone rear part being free of said connection points constitutes at least 5% of the entire transition zone area, preferably at least 10% of the entire transition zone area, and more preferably at least 20% of the entire transition zone area. Although the entire transition zone could be free of said connection points, the transition zone rear part suitably constitutes 5-90% of the entire transition zone area, preferably 10-70% of the entire transition zone area, and more preferably 20-50% of the entire transition zone area. Hereby, sufficient flexibility can be achieved.

According to a further embodiment, the transition zone rear part being free of said connection points constitutes at least 5% of the width of the one-piece pillar component in the transition zone, preferably at least 10% of the width of the one-piece pillar component in the transition zone, and more preferably at least 20% of the width of the one-piece pillar component in the transition zone. Although the entire width of the one-piece pillar component in the transition zone could be free of said connection points, the transition zone rear part suitably constitutes 5-90% of the width of the one-piece pillar component in the transition zone, preferably 10-70% of the width of the one-piece pillar component, and more preferably 20-50% of the width of the one-piece pillar component. Hereby, sufficient flexibility can be achieved.

According to a further embodiment, the continuous area being free of said connection points extends along substantially the entire length of the transition zone in the longitudinal extension direction of the vehicle pillar. Hereby, sufficient flexibility can be achieved.

According to a further embodiment, the transition zone has a curved portion with an inner curved part, wherein said continuous area being free of said connection points comprises the inner curved part. Hereby, sufficient flexibility can be achieved.

According to a further embodiment, the continuous area being free of said connection points comprises a rear part of the upper portion which upper portion rear part is situated closest to the rear end of the vehicle pillar and outside the transition zone. Hereby, the flexibility can be further increased.

According to a further embodiment, the continuous area being free of said connection points comprises a rear part of the lower portion which lower portion rear part is situated closest to the rear end of the vehicle pillar and outside the transition zone. Hereby, the flexibility can be further increased.

According to a further embodiment, the reinforcement component has a rear flange, wherein the reinforcement component is attached to the lower portion and to the upper portion of the one-piece pillar component by said reinforcement component rear flange which is attached to the one-piece pillar component at said connection points, and preferably the reinforcement component rear flange is attached to the one-piece pillar component outside the transition zone only. Hereby, the structural integrity is improved resulting in reduced risk of weld or material failure.

According to a further embodiment, the reinforcement component is attached to the one-piece pillar component at said connection points arranged in a front part of the transition zone. Hereby, the vehicle pillar can be further strengthened while still allowing flexibility in the rear end of the vehicle pillar.

The transition zone front part suitably constitutes maximum 20% of the entire transition zone area, preferably maximum 10% of the entire transition zone area, and more preferably maximum 5% of the entire transition zone area. Further, the transition zone front part suitably constitutes maximum 20% of the width of the one-piece pillar component in the transition zone, preferably maximum 10% of the width of the one-piece pillar component in the transition zone, and more preferably maximum 5% of the width of the one-piece pillar component in the transition zone.

According to a further embodiment, the one-piece pillar component is an outer pillar component and the reinforcement component is arranged inside the outer pillar component, and preferably the vehicle pillar comprises a further pillar component which is an inner pillar component, wherein the inner pillar component and the outer pillar component are attached to each other forming a hollow body, and the reinforcement component is arranged within the hollow body between the inner pillar component and the outer pillar component. Hereby, outside the transition zone, the reinforcement component can be attached to both the outer pillar component and the inner pillar component, by for example bolting and/or laser/GMAW-welding, such that the reinforcement component will act as a shear plane connecting the outer pillar component and the inner pillar component.

According to another aspect of the invention, the invention relates to a vehicle comprising a vehicle pillar as described herein. The advantages of the vehicle are similar to the advantages already discussed hereinabove with reference to the vehicle pillar.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
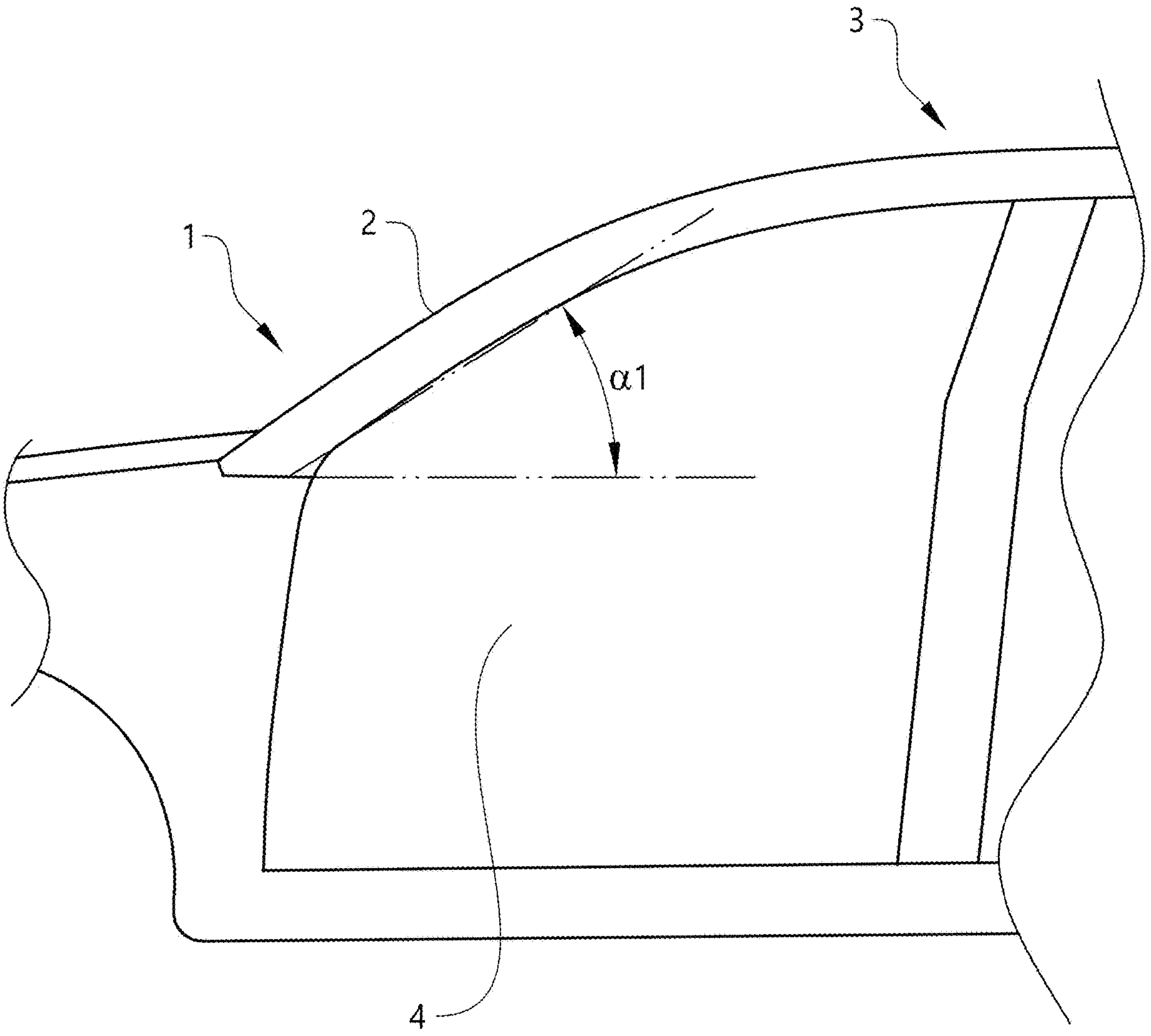
FIG. 1 Prior Art
FIG. 1 is a side view of a vehicle pillar according to prior art.

FIG. 1 shows a vehicle pillar 1 according to prior art. The vehicle pillar 1 is a so called A-pillar holding a windshield 2 of a vehicle 3 which vehicle pillar 1 delimits a front part of an opening 4 enabling access to the vehicle 3. The vehicle pillar 1 is arranged with a tilt angle $\alpha\mathbf{1}$ in the size of 30° relative to a horizontal plane (or the roof of the vehicle).

Figure 2:
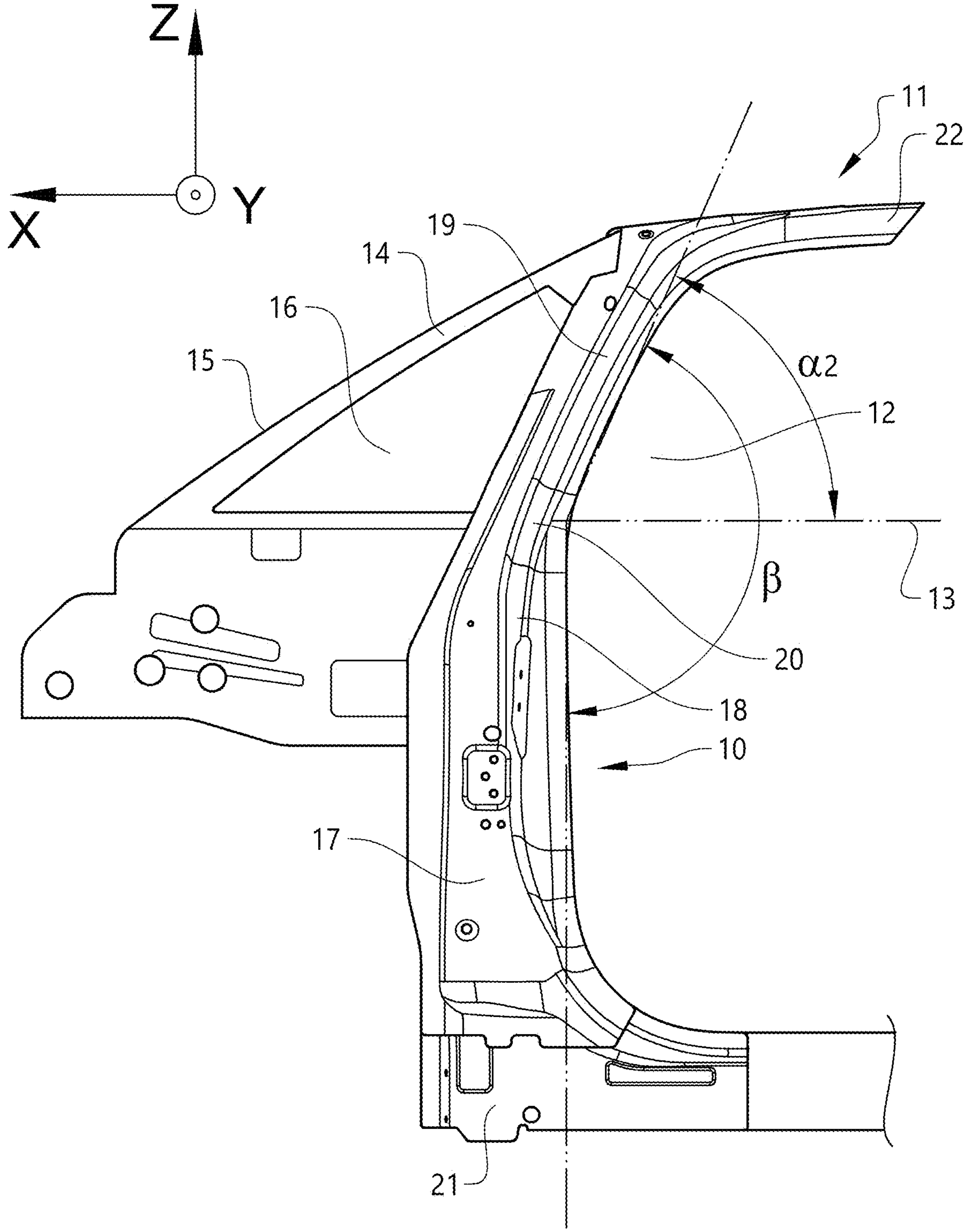
FIG. 2 is a side view of a vehicle pillar according to the invention.

FIG. 2 is a side view of a vehicle pillar 10 according to the invention of a passenger vehicle 11 such as a car. The front of the vehicle 11 is to the left and the rear of the vehicle 11 is to the right in FIG. 2. The vehicle pillar 10 is arranged in a front part on the left side of the vehicle 11 and is seen from outside the vehicle 11. A further identical but mirror-inverted vehicle pillar (not shown) is arranged in the front part on the right side of the vehicle.

The vehicle pillar 10 delimits a front part of an opening 12 enabling access to the vehicle 11. In order to provide improved access to the vehicle 11, the tilt angle $\alpha\mathbf{2}$ is increased relative to the tilt angle $\alpha\mathbf{1}$ of the conventional A-pillar illustrated in FIG. 1. The tilt angle $\alpha\mathbf{2}$ is suitably in the range 40-85°, preferably 50-80° and more preferably 60-75° relative to a horizontal plane 13.

Further, a Cartesian coordinate system X, Y, Z, where all axes are orthogonal to each other, is introduced in FIG. 2 for facilitating the explanation of the vehicle pillar 10 and how the vehicle pillar 10 is arranged relative to the vehicle 11. The directions and axes used herein, i.e. the X-axis, Y-axis and the Z-axis, are arranged relative to the vehicle 11 such that the X-axis is a horizontal axis in parallel with the normal driving direction of the vehicle, the Y-axis is a horizontal axis in parallel with the lateral extension of the vehicle (perpendicular to the paper), and the Z-axis is a vertical axis. Thus, the tilt angle $\alpha\mathbf{2}$ is indicated relative to the X-axis in the XZ-plane.

Although the vehicle pillar 10 could be arranged to hold a windshield as a conventional A-pillar, in the example embodiment illustrated in FIG. 2, the vehicle 11 has another strut 14 holding the windshield 15 in front of the vehicle pillar 10, and the vehicle pillar 10 is configured to hold a quarter glass 16 arranged between the strut 14 and the vehicle pillar 10. The vehicle pillar 10 is however to be considered as an A-pillar in the way that it constitutes the front pillar delimiting the front part of the opening 12 which opening enables access to the front seat of the vehicle and which opening is covered by a front door of the vehicle.

As further appears from FIG. 2, the elongated vehicle pillar 10 comprises a one-piece pillar component 17 or profile with a lower portion 18 and an upper portion 19. The one-piece pillar component 17 has a transition zone 20 where the longitudinal extension direction of the one-piece pillar component 17 is changed such that the lower portion 18 and the upper portion 19 are angled relative to each other.

In other words; the lower portion 18 and the upper portion 19 are made in one piece without any use of welding or similar.

To obtain the tilt angle α2 mentioned above, the lower portion 18 and the upper portion 19 are angled relative to each other with an angle β in the range 130-175°, preferably 140-170°, and more preferably 150-165°. The lower portion 18 is connected to a frame 21 of the vehicle 11, directly or via another component, and arranged substantially vertically, i.e. in parallel with the Z-axis. The upper portion 19 pointing upwards and backwards is connected to a roof 22 of the vehicle 11 and forms the tilt angle α2 relative to the X-axis.

Figure 3:
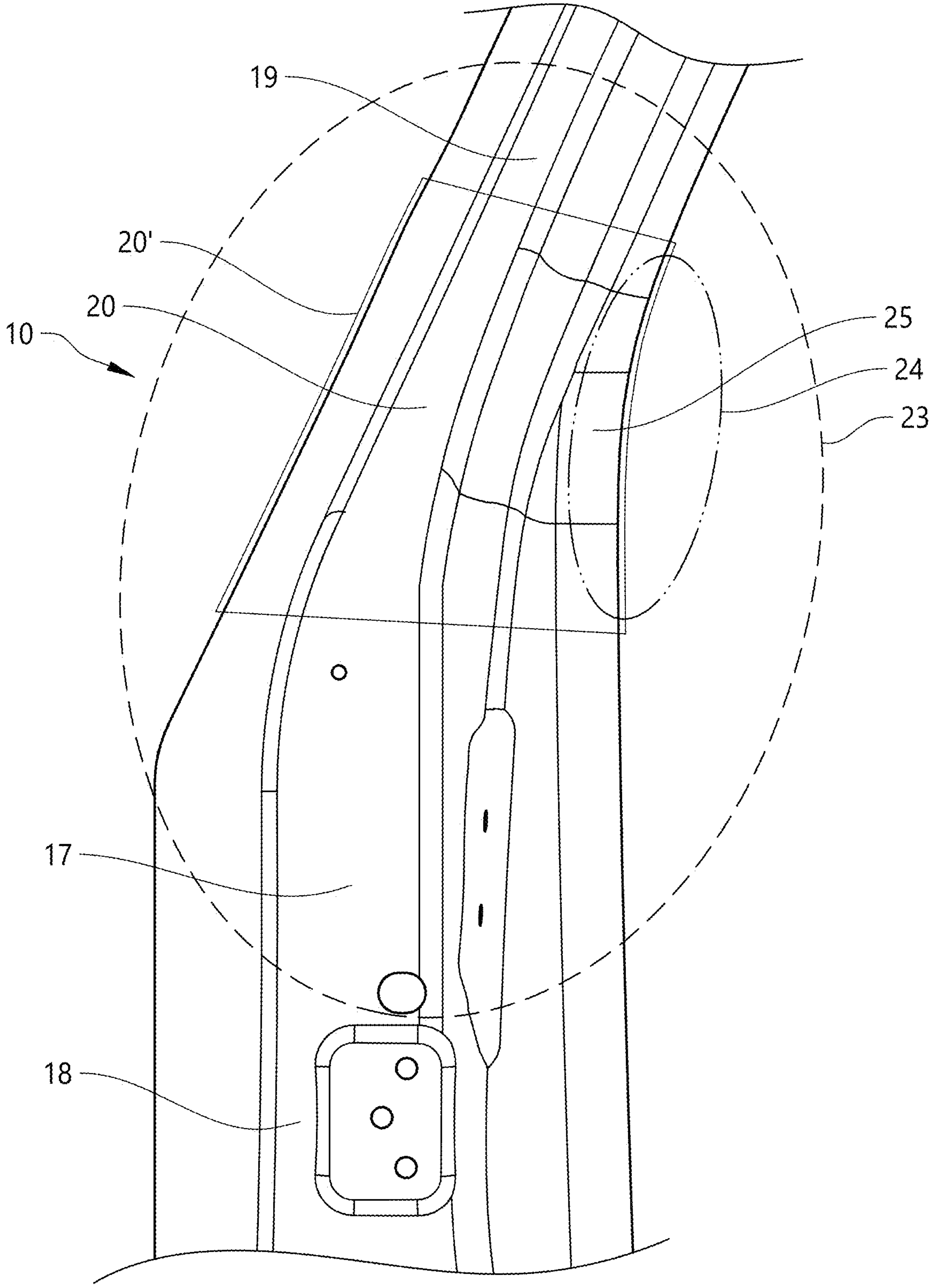
FIG. 3 is an enlarged view of the vehicle pillar in FIG. 2.

FIG. 3 shows an enlarged view of the vehicle pillar 10 in FIG. 2. The vehicle pillar 10 has to be strong in the area indicated with a dashed line 23 but at the same time sufficient flexibility is needed in the area indicated with a dotted line 24. The one-piece pillar component 17 with the lower portion 18 and the upper portion 19 is illustrated. Further, the transition zone 20 constituting the area where the vehicle pillar 10 changes direction is also indicated in FIG. 3 by a thin solid line 20'. The transition zone 20 can have a curved portion with an inner curved part 25.

Figure 4A:
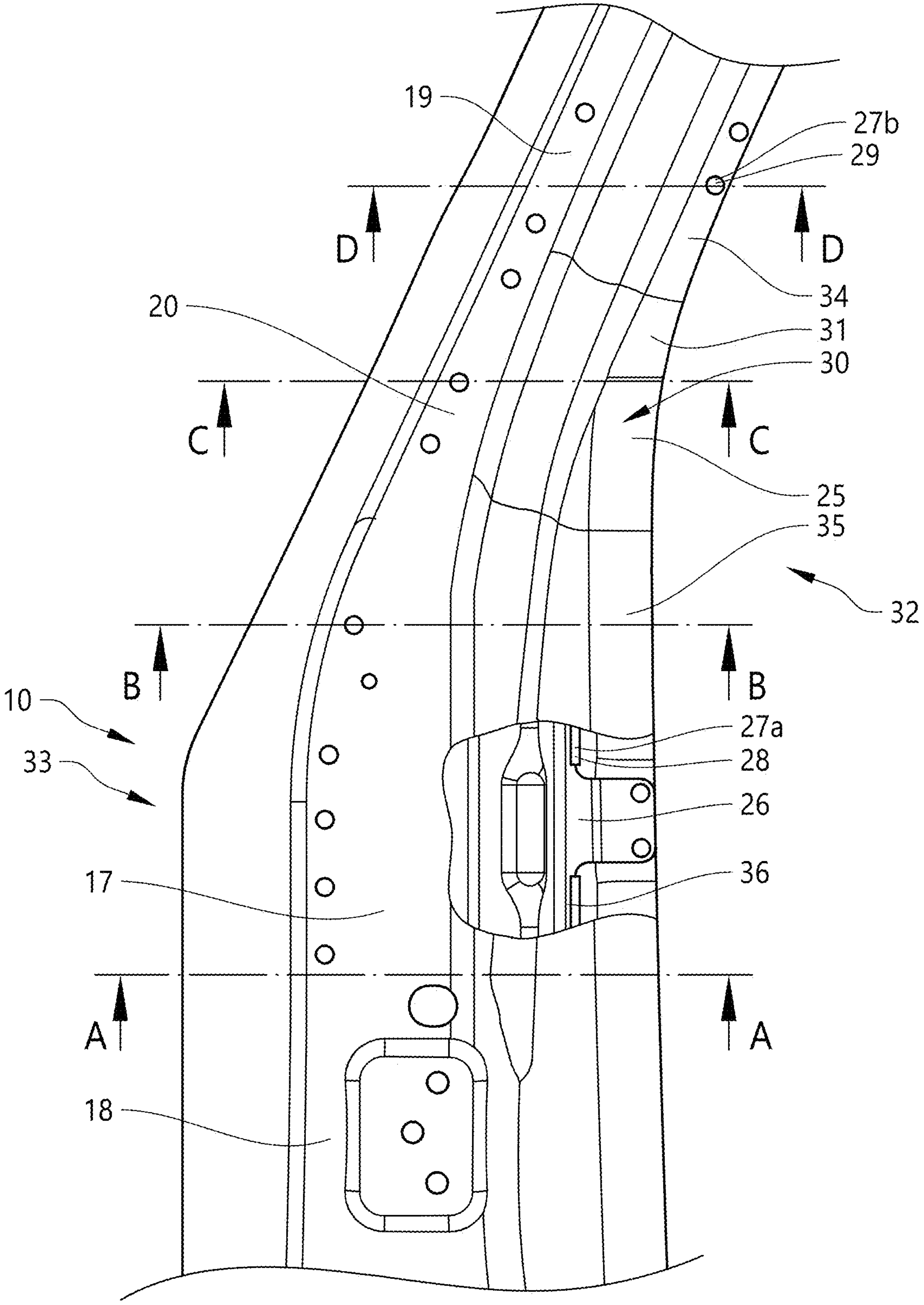
FIG. 4A is a partly cut enlarged view of the vehicle pillar in FIG. 2.

FIG. 4A is a partly cut enlarged view of the vehicle pillar 10 in FIG. 2. For achieving the requisite strength, the vehicle pillar 10 suitably comprises a reinforcement component 26 extending along the one-piece pillar component 17 from the lower portion 18 to the upper portion 19. Such a reinforcement component 26 can be arranged inside the one-piece pillar component 17 which then is an outer pillar component with respect to the lateral direction (in parallel with the Y-axis).

Figure 4B:
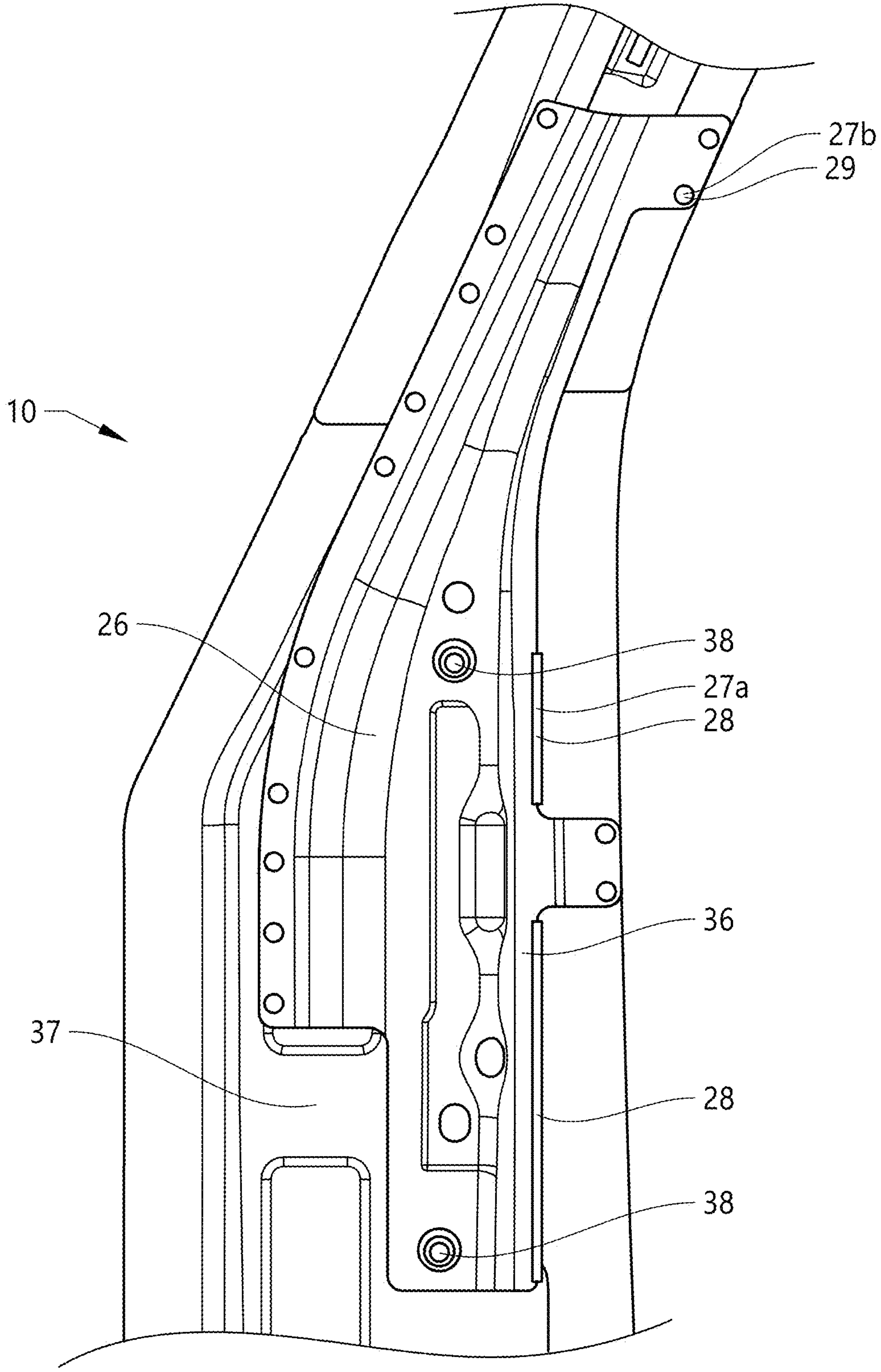
FIG. 4B is an enlarged view of the interior of the vehicle pillar in FIG. 2.

See also FIG. 4B showing the vehicle pillar 10 without the one-piece pillar component 17 for illustration purposes, and the cross section views in FIGS. 5A-5D showing the outer pillar component 17 and the reinforcement component 26.

The reinforcement component 26 is attached to the lower portion 18 and to the upper portion 19 of the one-piece pillar component 17 at connection points 27*a*, 27*b*. For example, welding seams, such as laser, brazing, and GMAW (Gas Metal Arc Welding), spot welding, rivets and/or bolted joints can be used for attaching the reinforcement component 26 and the one-piece pillar component 17 to each other.

In the example embodiment illustrated in FIG. 4A, the reinforcement component 26 is attached to the lower portion 18 at the connection points 27*a* by a welding seam 28, and the reinforcement component 26 is attached to the upper portion 19 at the connection points 27*b* by spot welds 29.

The vehicle pillar 10 has a continuous area 30 being free of said connection points 27*a*, 27*b* which allows movement of the one-piece pillar component 17 and the reinforcement component 26 relative to each other in said area 30. The area 30 being free of said connection points 27*a*, 27*b* comprises a rear part 31 of the transition zone 20. The transition zone rear part 31 is situated closest to a rear end 32 of the vehicle pillar 10. The rear end 32 of the vehicle pillar 10 is faced backward in the forward-backward direction (in parallel with the X-axis). The vehicle pillar 10 also has a front end 33 faced forward in the forward-backward direction. The continuous area being free of said connection points 27*a*, 27*b* preferably comprises the inner curved part 25 of the transition zone 20.

In addition to a rear part 31 of the transition zone 20, the continuous area 30 being free of said connection points 27*a*, 27*b* may comprise a rear part 34, 35 of the upper and/or lower portion which upper/lower portion rear part 34, 35 is situated closest to the rear end 32 of the vehicle pillar 10 and outside the transition zone 20.

As appears for example from FIGS. 5A-5D, the reinforcement component 26 suitably has a rear flange 36 for attachment to the one-piece pillar component 17. The reinforcement component 26 can be attached to the lower portion 18 and to the upper portion 19 of the one-piece pillar component 17 by said reinforcement component rear flange 36 which is attached to the one-piece pillar component 17 at said connection points 27*a*, 27*b*.

In the example embodiment illustrated in FIG. 4, the reinforcement component rear flange 36 is attached to both the lower portion 18 and the upper portion 19 of the one-piece pillar component 17 at said connection points 27*a*, 27*b* arranged outside the transition zone 20 only. Further, the continuous area 30 being free of said connection points 27*a*, 27*b* extends along the rear end 32 of the vehicle pillar 10 in the transition zone 20, preferably along the entire length of the transition zone 20 in the longitudinal extension direction of the vehicle pillar 10 (i.e. in the direction from the lower portion to the upper portion). In other words; the reinforcement component rear flange 36 is not attached to the one-piece pillar component 17 in the transition zone 20, but attached to both the lower portion 18 and the upper portion 19 of the one-piece pillar component 17 outside the transition zone 20.

However, the reinforcement component 26 can also be attached to the one-piece pillar component 17 at said connection points 27*c* arranged in a front part of the transition zone which transition zone front part is suitably situated closest to the front end 33 of the vehicle pillar 10.

As further appears from the cross section views in FIGS. 5A-5D, the vehicle pillar 10 suitably comprises a further pillar component 37, such as for example a further said one-piece pillar component 37, which is an inner pillar component with respect to the lateral direction as mentioned above. The inner pillar component 37 and the outer pillar component 17 are attached to each other forming a hollow body of the vehicle pillar 10. The reinforcement component 26 is arranged within the hollow body between the inner pillar component 37 and the outer pillar component 17, i.e. the reinforcement component 26 is arranged inside the outer pillar component 17 and outside the inner pillar component 37 in the lateral direction (in parallel with the Y-axis in FIG. 2). Outside the transition zone 20, the reinforcement component 26 is attached to both the outer pillar component 17 and the inner pillar component 37, by for example bolting, laser/GMAW-welding or similar, such that the reinforcement component 26 will act as a shear plane connecting the outer pillar component 17 and the inner pillar component 37.

See also FIG. 4B, where the reinforcement component 26 is attached to the inner pillar component 37 with bolt joints 38.

Figure 5A:
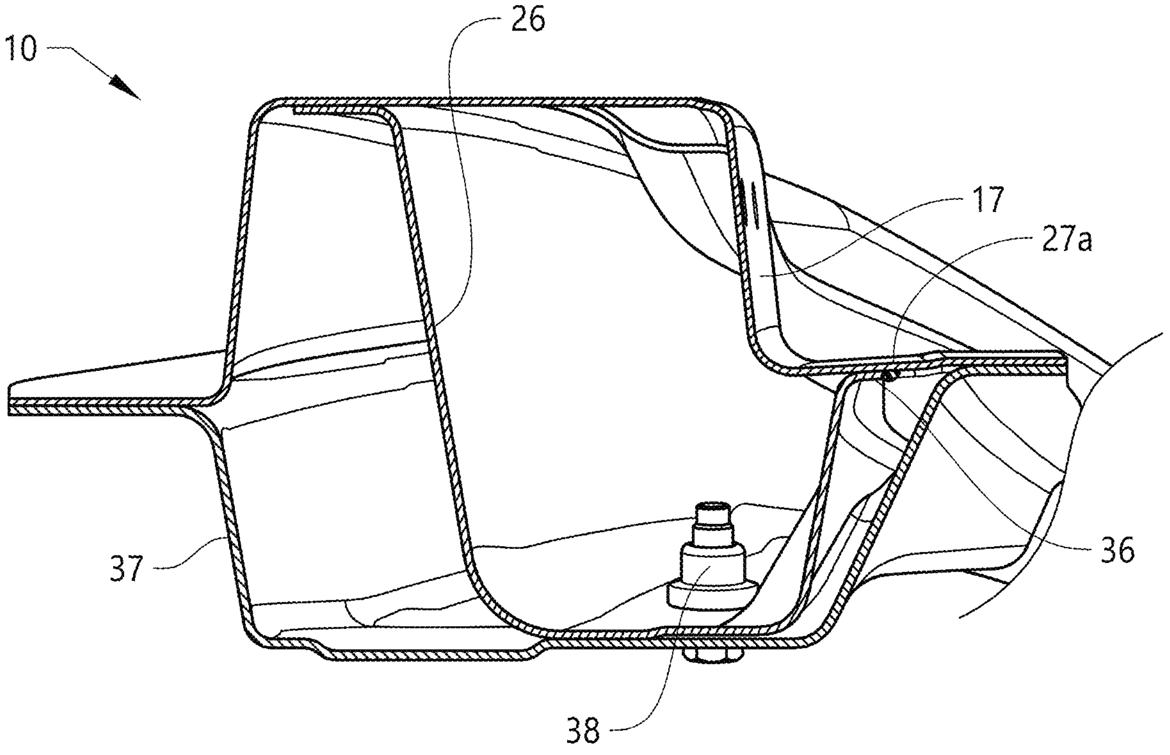
FIG. 5A is a cross section view along line A-A in FIG. 4A.

FIG. 5A shows a cross section view where the reinforcement component 26 is attached to the lower portion 18 of the outer pillar component 17 by welding seams at the connection points 27*a* and to the inner pillar component 37 by the bolted joints 38.

Figure 5B:
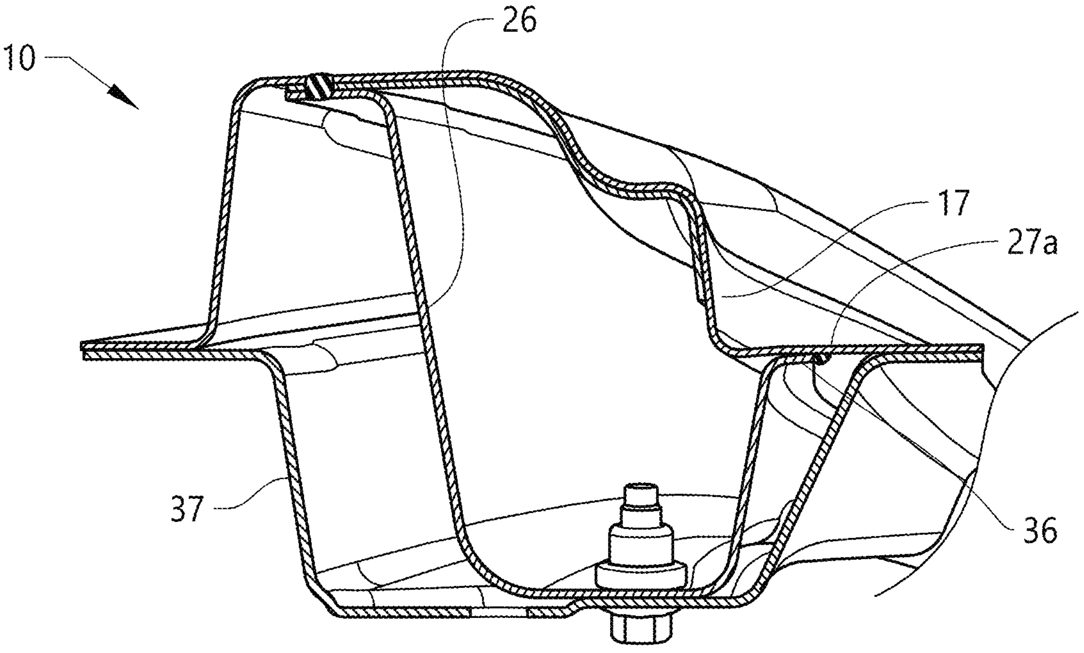
FIG. 5B is a cross section view along line B-B in FIG. 4A.

FIG. 5B shows a cross section view where the reinforcement component rear flange 36 is attached to the lower portion 18 of the outer pillar component 17 by welding, such as laser welding.

Figure 5C:
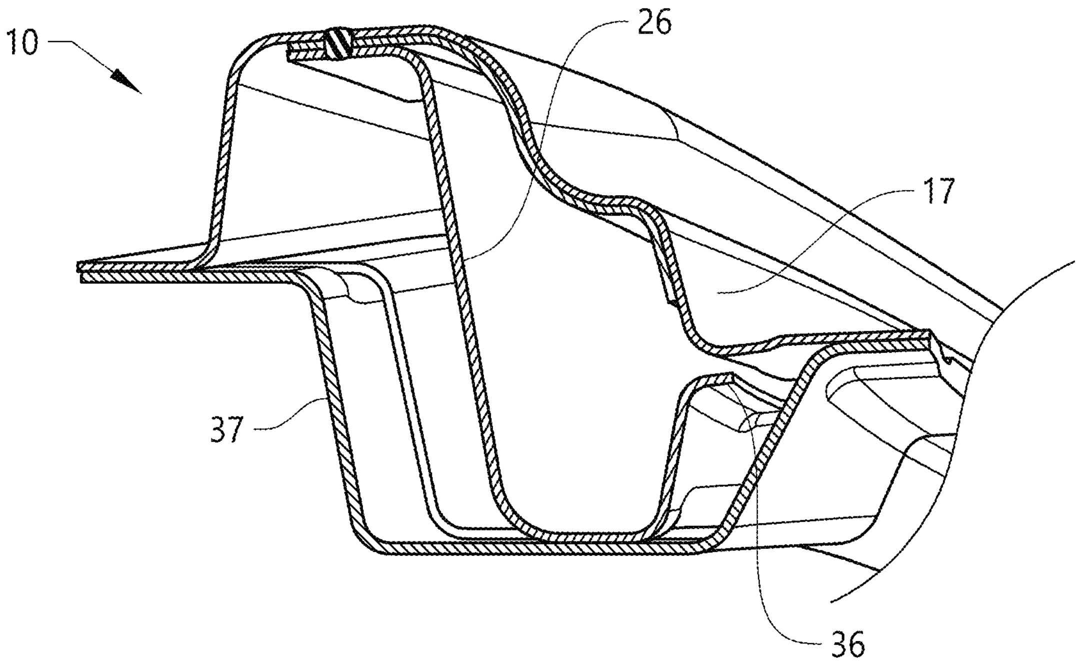
FIG. 5C is a cross section view along line C-C in FIG. 4A.

FIG. 5C shows a cross section view in the transition zone in a part comprised in the continuous area 30 being free of said connection points 27*a*, 27*b*. In other words; there is no connection between the reinforcement component rear flange 36 and the outer pillar component 17, though a front part flange of the reinforcement component 26 can be attached to the outer pillar component 17.

Figure 5D:
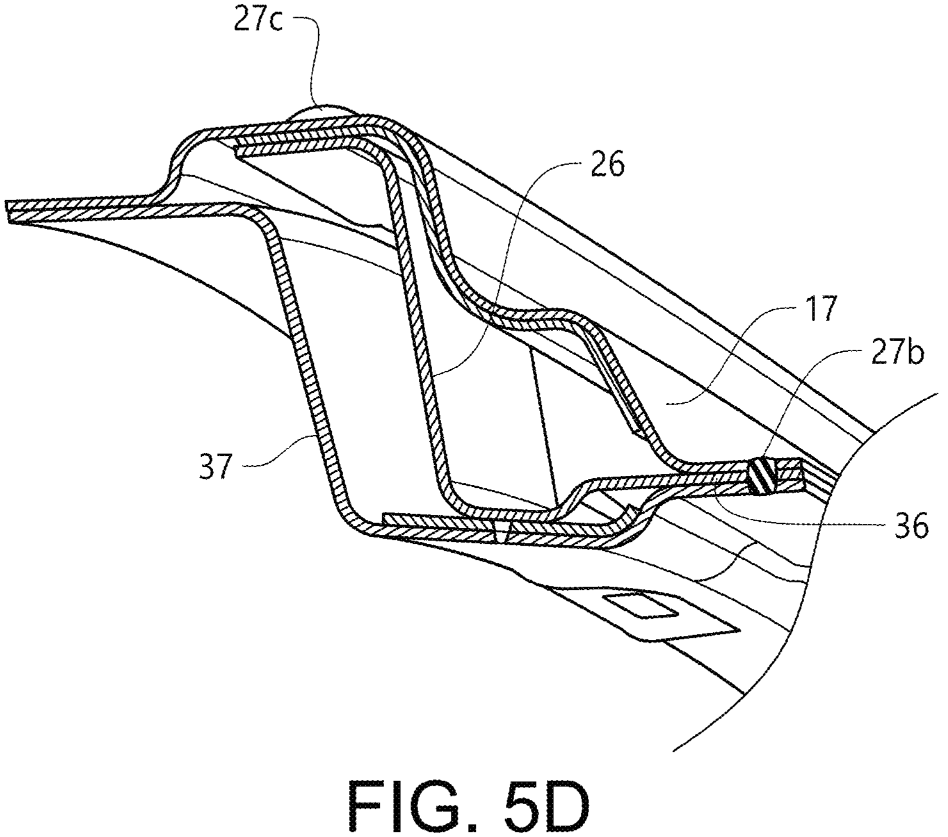
FIG. 5D is a cross section view along line D-D in FIG. 4A.

FIG. 5D shows a cross section view where the reinforcement component rear flange 36 is attached to the upper portion 19 of the outer pillar component 17 by welding, such as spot welding, at the connection points 27*b*. In addition, a front part of the reinforcement component 26 is also spot-welded to the outer pillar component 17 at the connection points 27*c*.

It is to be understood that the present invention is not limited to the embodiments described above and illustrated in the drawings; rather, the skilled person will recognize that many changes and modifications may be made within the scope of the appended claims.

What is claimed is:

1. A vehicle pillar comprising:

a one-piece pillar component with a lower portion and an upper portion, the one-piece pillar component having a transition zone where the longitudinal extension direction of the one-piece pillar component is changed such that the lower portion and the upper portion are angled relative to each other, the lower portion being connectable to a frame of a vehicle and the upper portion being connectable to a roof of the vehicle; and a reinforcement component extending along the one-piece pillar component from the lower portion to the upper portion, the reinforcement component being attached to the lower portion and to the upper portion of the one-piece pillar component at connection points, the vehicle pillar having a continuous area being free of said connection points allowing movement of the one-piece pillar component and the reinforcement component relative to each other in said area, said area comprising a rear part of the transition zone which transition zone rear part is situated closest to a rear end of the vehicle pillar.

2. The vehicle pillar according to claim 1, wherein the transition zone rear part being free of said connection points constitutes at least 5% of the entire transition zone area.

3. The vehicle pillar according to claim 1, wherein the transition zone rear part being free of said connection points constitutes at least 5% of the width of the one-piece pillar component in the transition zone.

4. The vehicle pillar according to claim 1, wherein the continuous area being free of said connection points extends along substantially the entire length of the transition zone in the longitudinal extension direction of the vehicle pillar.

5. The vehicle pillar according to claim 1, wherein the transition zone has a curved portion with an inner curved part, said continuous area being free of said connection points comprising the inner curved part.

6. The vehicle pillar according to claim 1, wherein the continuous area being free of said connection points comprises a rear part of the upper portion which upper portion rear part is situated closest to the rear end of the vehicle pillar and outside the transition zone.

7. The vehicle pillar according to claim 1, wherein the continuous area being free of said connection points comprises a rear part of the lower portion which lower portion rear part is situated closest to the rear end of the vehicle pillar and outside the transition zone.

8. The vehicle pillar according to claim 1, wherein the reinforcement component has a rear flange, the reinforcement component being attached to the lower portion and to the upper portion of the one-piece pillar component by said reinforcement component rear flange which is attached to the one-piece pillar component at said connection points.

9. The vehicle pillar according to claim 8, wherein the reinforcement component rear flange is attached to the one-piece pillar component outside the transition zone only.

10. The vehicle pillar according to claim 1, wherein the reinforcement component is attached to the one-piece pillar component at said connection points arranged in a front part of the transition zone.

11. The vehicle pillar according to claim 1, wherein the one-piece pillar component is an outer pillar component and the reinforcement component is arranged inside the outer pillar component.

12. The vehicle pillar according to claim 11, wherein the vehicle pillar comprises a further pillar component which is an inner pillar component, the inner pillar component and the outer pillar component being attached to each other forming a hollow body, the reinforcement component being arranged within the hollow body between the inner pillar component and the outer pillar component.

13. The vehicle pillar according to claim 1, wherein the lower portion and the upper portion are angled relative to each other with an angle in the range 130-175°.

14. A vehicle comprising the vehicle pillar according to claim 1.

15. The vehicle pillar according to claim 1, wherein the transition zone rear part being free of said connection points constitutes at least 10% of the entire transition zone area.

16. The vehicle pillar according to claim 1, wherein the transition zone rear part being free of said connection points constitutes at least 20% of the entire transition zone area.

17. The vehicle pillar according to claim 1, wherein the transition zone rear part being free of said connection points constitutes at least 10% of the width of the one-piece pillar component in the transition zone.

18. The vehicle pillar according to claim 1, wherein the transition zone rear part being free of said connection points constitutes at least 20% of the width of the one-piece pillar component in the transition zone.

19. The vehicle pillar according to claim 1, wherein the lower portion and the upper portion are angled relative to each other with an angle in the range 140-170°.

* * * * *